United States Patent [19]

Onoue

[11] 4,310,999
[45] Jan. 19, 1982

[54] ROTARY BLADE FOR PRUNING MACHINES

[75] Inventor: Toshikatsu Onoue, Hyogo, Japan

[73] Assignee: Sanny Industry Co., Ltd., Hyogo, Japan

[21] Appl. No.: 58,380

[22] Filed: Jul. 17, 1979

[30] Foreign Application Priority Data

| Jul. 17, 1978 | [JP] | Japan | 53-98788 |
| Aug. 19, 1978 | [JP] | Japan | 53-101150 |
| Nov. 1, 1978 | [JP] | Japan | 53-135287 |
| Feb. 21, 1979 | [JP] | Japan | 54-22247 |

[51] Int. Cl.³ .......................................... A01D 55/18
[52] U.S. Cl. .......................................... 56/295; 30/347; 30/349
[58] Field of Search ..................... 56/295; 30/347, 349

[56] References Cited

U.S. PATENT DOCUMENTS

| 2,256,847 | 9/1941 | Osenberg | 30/349 |
| 2,484,276 | 10/1949 | Eberhart | 56/295 |
| 2,850,056 | 9/1958 | Kehl | 56/295 |
| 3,133,398 | 5/1964 | Tatum | 56/295 |
| 3,176,455 | 4/1965 | Buchanan | 30/347 |
| 3,184,785 | 5/1965 | Wezel | 30/347 |
| 3,214,896 | 11/1965 | Watkins et al. | 56/295 |
| 3,279,159 | 10/1966 | Paul | 56/295 |
| 3,340,682 | 9/1967 | Ely | 56/295 |
| 3,343,350 | 9/1967 | Freedlander et al. | 56/295 |
| 3,369,384 | 2/1968 | Freedlander et al. | 56/295 |
| 3,398,517 | 8/1968 | Freedlander et al. | 56/295 |
| 3,440,808 | 4/1969 | Freedlander et al. | 56/295 |
| 3,465,508 | 9/1969 | Edwards | 56/295 |
| 3,545,189 | 12/1970 | Gillaspie et al. | 56/295 |
| 3,614,861 | 10/1971 | Wickham et al. | 56/295 |
| 3,788,050 | 1/1974 | Houst et al. | 56/295 |
| 3,911,652 | 10/1975 | Houle | 56/295 |
| 4,175,367 | 11/1979 | Bovet | 56/295 |

FOREIGN PATENT DOCUMENTS 266830 12/1966 Australia .......................... 56/295

Primary Examiner—Paul J. Hirsch
Attorney, Agent, or Firm—Birch, Stewart, Kolasch and Birch

[57] ABSTRACT

A rotary blade for a pruning machine which comprises a flexible disc made from a high molecular weight elastomeric material, said disc having a plurality of blades projecting radially from the periphery of said disc and a mounting hole disposed in the center of said disc.

18 Claims, 18 Drawing Figures

B—B

A—A

C—C

D—D

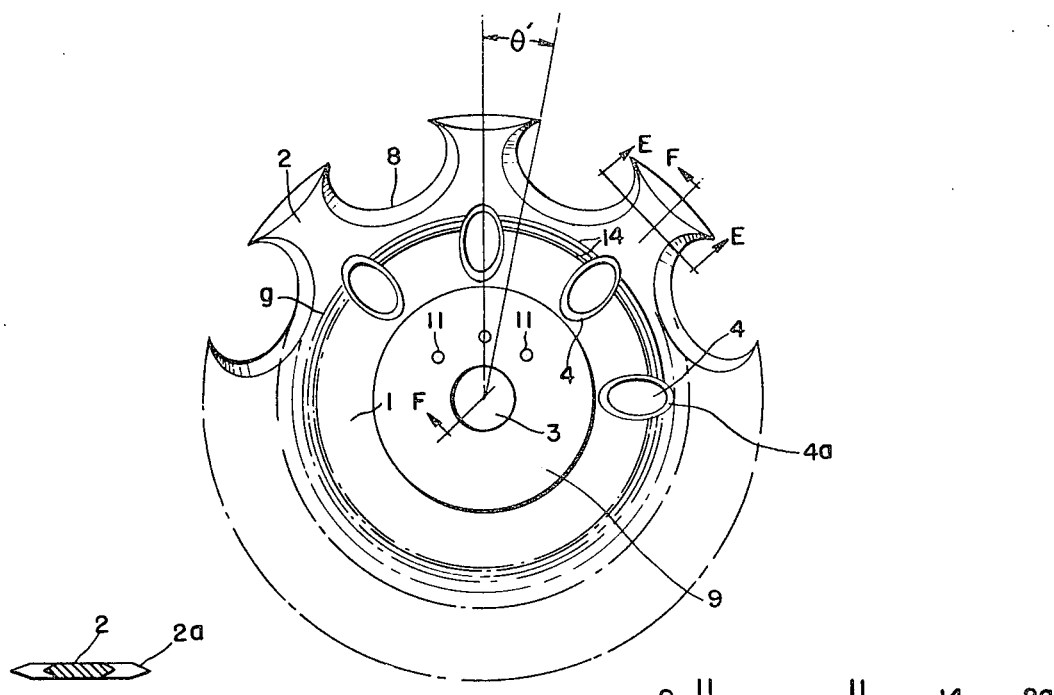
FIG. 3
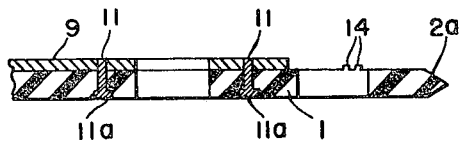
E-E
FIG. 3A
F-F
FIG. 3B
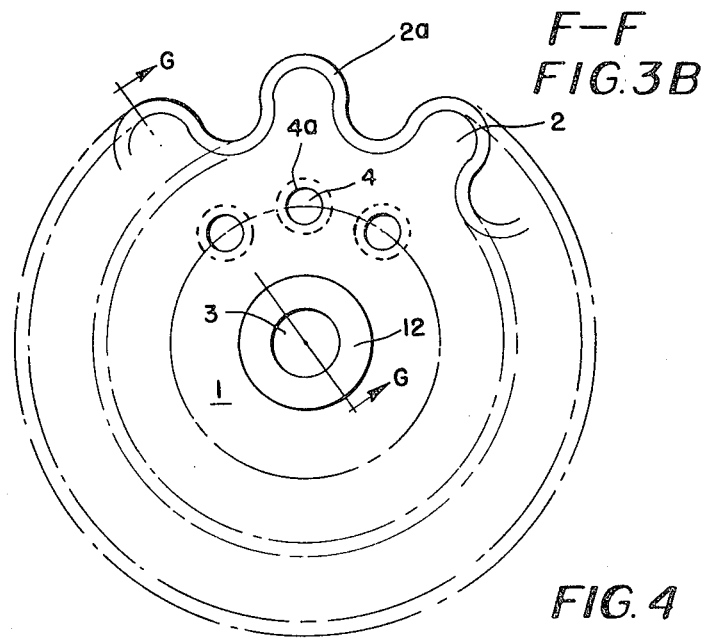
FIG. 4
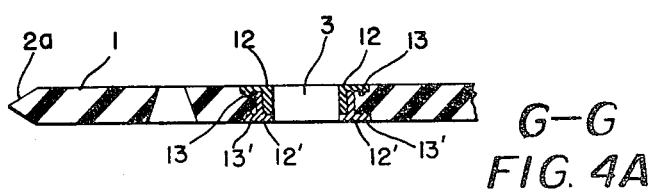
G-G
FIG. 4A

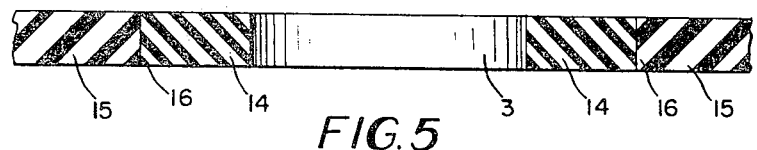
FIG. 5
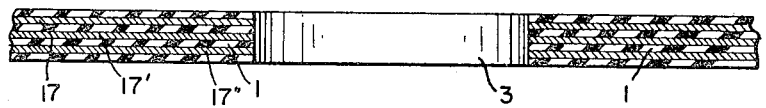
FIG. 6
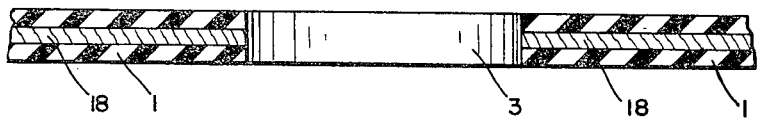
FIG. 7
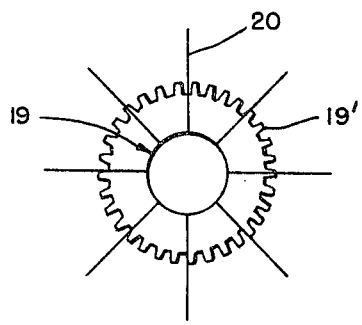
FIG. 8
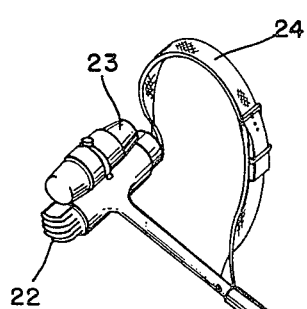
FIG. 9
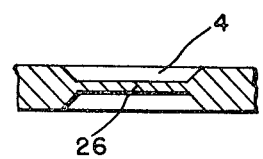
FIG. 10
FIG. 11
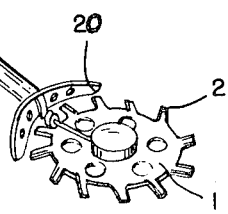

ROTARY BLADE FOR PRUNING MACHINES

BACKGROUND AND SUMMARY OF THE INVENTION

The present invention relates to a rotary blade for pruning machines, for example, lawn mowers. More particularly, the present invention is directed to a rotary blade for engine-driven or motor-driven pruning machines.

Pruning machines which use a metal blade and are driven by an internal combustion engine or an electric motor are well known in the art. The blade is rotated substantially parallel to the ground, and the machine can be freely pushed to any area to be pruned with the use of very little manpower and is efficient for cutting in comparatively narrow spaces. These well known devices can be used to cut grass and weeds, whether tall or short or tough or fragile. However, unfortunately, because of the high speed of rotation of the cutting blades in these devices, up to about 6,000 rpm or more, it can be extremely dangerous not only for the operator per se but also for persons in the vicinity of the cutting operation. For example, there have been many cases where the operator's foot has accidentally slipped under the housing and has been struck by the rotating blade, causing serious injury. Moreover, if the blade accidentally contacts any rigid obstacles, it may counteract and strike the operator himself or any other person nearby, causing serious injury. Thus, it is not unusual that a broken portion of the blade will be discharged from the device, causing injury to a person standing nearby. Furthermore, even in the case where no obstacles are present, there still exists the danger of operator mistake.

In this connection, there have been proposed certain flat, bar-type blades made from high molecular weight elastomeric material, such as polyurethane elastomers, according to U.S. Pat. Nos. 3,343,350, 3,623,305 to Freedlander e al. However, such flat, bar-type blades are only effective for cutting short and fragile grasses but are ineffective for cutting thick ligneous weeds, such as Ambrosia artemisilifolia L. (Bitter weed) or Solidago alti (ssima L.) because the cutting of such ligneous weeds violently shock the operator when they are cut down due to the comparatively long blade length and their intermittent cutting action. Moreover, if a portion of the blade becomes broken away as a result of a collision with any rigid obstacle, such as a hidden tap, iron post or rock, a violent vibration will occur due to an imbalance created in the blade structure. This makes the device inoperable. The present invention is intended to eliminate the above defects which are known to exist in elastomeric flat, bar-type blades.

An object of the present invention is to provide a novel elastomeric rotary blade for pruning machines which is effective in cutting the thick ligneous stalks of the weeds.

Another object of the present invention is to provide a novel, elastomeric rotary blade which is easy to care for and provides safety in operation.

A further object of the present invention is to provide a rotary blade which is seldom broken when it collides with a rigid obstacle.

Still another object of the present invention is to provide a blade which can be positively operated, regardless of obstacles, in an area where many visible obstacles are present.

Yet another object of the present invention is to provide a novel, long-life blade which can be readily removed from the pruning device when the blade becomes worn.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

As result of a long study and many experiments, it has been found that a rotary disc-type blade having a plurality of blade bodies radially projecting from its periphery will give far less shock to the operator when compared with known bar-type blades, when the blades collide with a rigid obstacle. It has furthermore been found that this shock is also substantially reduced if a plurality of holes are provided along the periphery of the disc portion or supporting member of the blade. Thus, narrow blade bodies are more easily bent than are the broader, bar-type blade bodies and this bending occurs more readily if a large round hole is disposed nearby. Because of the extraordinary high speed of rotation, up to about 6,000 rpm, even if the first blade which contacts a rigid stalk of weed is bent, the next blade instantly contacts the stalk damaged by the first blade body and, consequently, smoothly cuts down the stalk with little shock being transferred to the operator. Such a result was unexpected.

One of the characteristic features of the present invention is the use of a high molecular weight elastomeric material as the sole principal material of which the blade, including the blade bodies, is made. Suitable elastomeric materials which can be used include natural rubber, styrene-butadiene rubber, polychloroprene, cis-1,4-polyisoprene, cis-1,4-polybutadiene, syndiotactic 1,2-polybutadiene, ethylene-propylene copolymer, ethylene-propylene rubber, butyl rubber, polyurethane polyester elastomers, Hypalon$^R$ (CSM), polyvinyl ethers, polypropylene oxide, epoxy resins including polyepichlorhydrine, polystyrene, polybutadiene block copolymers, butadiene-ethylene copolymer, isobutylene-isoprene copolymer, chlorosulfonated polyethylene, organic polysulfides, acrylic rubbers, and ethylene-vinyl acetate copolymer.

In consideration of the objects of the present invention, it is preferable that the material used, if possible possess, good tensile strength, good tear resistance, good abrasion resistance and good flexibility. Also, since the blade is often exposed to strong sunlight, especially in summer, it is preferable that the elastomer possess good light stability.

The preferred elastomers include natural rubber, polyisoprene, polychloroprene, polyurethanes or polyesters and the like. Although polyurethane elastomers and polyester elstomers tend to elongate due to tension, they are particularly effective materials for the practice of the present invention.

Materials other than polyurethanes or polyesters which are somewhat less useful in view of their mechanical properties, namely a comparatively poor tear strength and abrasion resistance, and/or large elongation, can be substantially improved up to the same degree with those of the polyurethanes or polyesters by admixing thereinto some reinforcing agents or reinforcing materials such as silica (amorphous silicone dioxide), carbon black, staples of synthetic, carbon or glass fibers, cat whisker or the like. Accordingly, it should be understood that the above recommendation with respect to polyurethanes or polyester elastomers relates to the best sole material which can be used without the presence of any reinforcement material. When using polyurethanes and polyesters, a reinforcing agent such as glass fibers may be used to improve the elongation of the polyurethanes or polyesters.

It is possible to improve the heat durability, the abrasion resistance or the creep resistance, or to lower the cost by blending the elastomer with the usual synthetic resins such as polyvinyl chloride, acrylonitrile-butadiene-styrene polymer, polyolefins, ethylene vinyl acetate copolymers, acrylonitrilestyrene copolymers and the like or special resins such as acetal resins, silicone resins, fluorine-containing resins and the like. Generally speaking, the blend of other resins into the urethane resin (elastomer) inherently reduces the elasticity of the urethane resin, but, on the other hand, makes it easier to resharpen the blade. Particularly the use of a small amount of a fluorine-containing resin, preferably a perfluoro resin such as polytetrafluoroethylene is noteworthy because of its marked effect on the coefficient of friction.

When injection molding is used for the production of the blade of the present invention, the amount of the additive reinforcing materials such as glass fiber staples which may be added into the elastomer base material, will be limited due to the effect on the fluidity of the basic resin. When thermoplastic-type polyurethanes are utilized, the additive can be added in an amount of about 15 to 30% by weight based on the weight of the resin and depending on the grade of the resin and the temperature of the operation. Similarly, the maximum length of the additive staples is up to about 15 mm.

The novel blade of the present invention has a good sharpness which has the same effectiveness in cutting thick, ligneous stalks of weeds as the conventional steel blades but is far superior in this regard to known flat bar-type elastomer blades and can efficiently and smoothly achieve the desired cutting operation without material shock to the operator's hand.

During the testing of the blade of the present invention, it was discovered that the engagement by the binding nut which secures the blade to the drive shaft will sometimes become loose due to the operation of the device. One of the factors which causes this phenomenon is the creepness and the stress relaxation of the material being utilized. When the blade is continuously held to the drive shaft for a long time under the strong compression of the screw, a semi-permanent distortion in the blade may occur. Then, as the stress is lowered, the resilient power to the binding nut becomes lower and, thus, the screw may eventually become loosened. However, the direct cause of this loosening effect is perhaps the centrifugal force and the radial elongation of the blade caused thereby. The relaxation phenomenon is substantially caused by the large centrifugal force, greater than 13,000 G's, due to the rapid rotation of the blade. Naturally, this force will gradually decrease toward the center of the blade, in proportion to the decrease of the radius, but the blade will be radially stretched with this large force, and concurrent with this elongation, the thickness of the blade will be reduced, even at its central mounting hole nearby. Thus, to prevent such elongation and to achieve commercialization of the elastomeric rotary blade of the present invention, the following techniques are utilized:

(a) A core made of a rigid material is inserted into the area surrounding the mounting hole;

(b) A cover made of a rigid material and connected with the supporting member is installed over one or both surfaces of the supporting member surrounding the mounting hole;

(c) A cloth or a net-type material having a high Young's modulus is inserted into the supporting member surrounding the mounting hole;

(d) A linear material having a high Young's modulus is disposed so as to radially surround the mounting hole;

(e) The central portion of the supporting member is made of a hard high molecular weight elastomer and the outer circumference is made of a more flexible, high molecular weight elastomer;

(f) A device comprising any combination of the above techniques (a) to (e).

The term "blade body" as discussed above means the blade per se or the blade including the neighboring elements thereof. Thus, the term "blade" includes the blade body and the disc-like supporting member.

With respect to the techniques (a) to (f) above, (a) is the one most generally used. The core can easily be positioned in the disc by any insert molding technique when injection molding is utilized, or by a two-step pouring method of the raw material into dies when compression molding is applied thereto. As to the type of core material, a steel disc having a thickness of about 1 mm is frequently used, but any rigid material such as aluminum or titanium or an engineering type of plastic may also be used in place of a steel core. Advantageously, a plurality of small radial or circular holes are provided in the blade in the vicinity of the core so as to expose both the upper and the lower core surfaces to the environment throughout these holes. However, if the core per se is compatible with the high molecular weight elastomer utilized, these holes can be reduced in number or omitted.

The diameter of the core may be from about one-third to about one-half of that of the blade. If the diameter is greater than this amount, the flexibility of the disc (the supporting member) at its marginal portion will be reduced.

According to the (b) technique, the molded blade is covered with a rigid material at its central portion. The shapes and the sizes of the covers may be designed as in the device (a). The cover may be provided on one side surface of the blade, but it is more preferable to cover both side surfaces of the blade. The cover must be closely connected with the disc. To provide this connection, any appropriate method such as rivetting (when the covers exist on both sides of the blade) or pinning (when the cover exists on one side of the blade) is usually applied. However, these illustrations are merely illustrative. Other devices include means wherein a pair of washers having elongated sleeves are joined together so as to make an intimate connection as well as the formation of a central mounting hole as hereinafter described.

The (c) technique may be realized by utilizing insert molding or compression molding. The cloths usually inserted into the supporting member are woven polyamides, polyethylene terephthalate or glass fibers. If desired, a steel net electrically plated with copper may be utilized. Generally, any synthetic fiber which has a high affinity to high molecular weight elastomers can be utilized. However, the affinity of glass fiber to high molecular weight elastomers is comparatively low due to attached machine oil, etc. Because of this, an activation treatment such as borane or a silicone pretreatment is preferable for the glass fiber.

A canvas inserted according to this means never adversely affects the flexibility of the blade and, accordingly, it is possible to extend the diameter of the inserted canvas up to the peripheral circles or even through the blade body per se. The inserting method can be carried out manually on an industrial scale similar to the hand lay-up method used in fiber reinforced plastics by utilizing dissolved high molecular weight elastomers in an appropriate solvent or by utilizing low molecular weight liquid elastomers insufficiently polymerized together with a catalyst.

The technique may be carried out similarly as in the technique (c). In this method a reinforcement made from linear materials which are combined concentrically and radially to form said reinforcement are charged into a metal mold and then compressed. As usable linear materials, there can be included tire cord, glass fibers, yarn, carbon fiber, piano wire, or phosphor bronze wire, etc. The last two materials have the advantage that the wiremade reinforcement is so tough but flexible that it can be easily put into the mold and, furthermore, the molded product (the blade) is sufficiently reinforced up to its blade body without losing its own flexibility. Also, in this case, an activation treatment, as in the (c) technique, will be preferred.

The (e) technique can be utilized with the same kind of high molecular weight polymers (elastomers). Therefore, there is little problem as to compatibility at the interface zone. However, a substantial tension will exist at the interface between the central hard elastomer and outer soft elastomer. Thus, it is desirable that high tensile fibers or whiskers be provided to radially traverse over the interface. The elastomer at the center of the supporting member can be hardened by means of curing, adding thereto a large amount of filler such as carbon black, silica, etc., or by blending with glass fiber staples.

The above five techniques, as explained above, may be used solely or in combination. For example, to extend a radial reinforcement made from rigid wire, from piano wire or from phosphor bronze wire (or beryllium bronze wire) toward the outer direction so as to form thorns and to bury their point portions into the blade body can be regarded as a combination of techniques (a) and (d). This is a useful embodiment of the present invention. Moreover, this thorn-like reinforcement can be modified with concentric rings made from the same kind of wire so that a framework can be prepared. This framework can easily be put into a die on the molding.

As shown by the attached drawings, the blade bodies of this invention may take several shapes. A rectangular blade body as shown in FIG. 1 is the most standard type. If the blade bodies are somewhat inclined to the radius direction as shown in this figure, it becomes possible to change the direction of the acting blades depending on the kinds and density of the weeds being pruned away. FIG. 2 shows a rotary saw-type blade; FIG. 3 shows a concaved blade and FIG. 4 shows a blade having an involuted shape. However, whatever shape of the blade body is utilized, it is desired that a plurality of blade bodies project approximately radially from the circumference of the disclike supporting member.

The blade bodies of the present invention, made from high molecular weight of elastomers, are very tough against abrasion, but they can be easily resharpened with a grinder. However, if the inner walls of the buffering holes are sharpened so as to form a sharp edge, it is very convenient to recover the worn blade. In order to recover by cutting the outer portion of the blade away, proper marking, such as the use of double-relief concentric circles, may be provided at the desired cutting line, as shown hereinbelow. The cutting line should lie so as to cross with the buffering holes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 3 is a plan view of a further embodiment of the disc blade of the present invention;

FIG. 3A is a sectional view taken along line E—E of FIG. 3;

FIG. 3B is a sectional view taken along line F—F of FIG. 3;

FIG. 4 is a plan view of yet another embodiment of the disc blade of the present invention;

FIG. 4A is a sectional view taken along line G—G of FIG. 4;

FIGS. 5 to 8 show various means for reinforcing the disc blade of the present invention;

FIG. 9 schematically shows one embodiment of a cutting device using the disc blade of the present invention.

FIG. 10 shows, in cross section, the use of a membrane across the buffering hole; and FIG. 11 shows a double-tapered blade when compared to a single-tapered blade.

In FIG. 1 a plurality of blade bodies 2 equiangularly and radially project from the circumference of a disc-shaped supporting member 1 made of, for example, a polyurethane or polyester elastomer having a thickness T. There is provided one mounting hole 3 having a radius $R_2$ and provided with a lock (key groove) 3a at the center thereof. A number of buffering holes (shock-absorbing holes) 4 having a radius $R_4$ are disposed on a circle having a radius $R_3$ as measured from the center of the disc. The blade bodies 2 are inclined at an angle $\theta$ with respect to the line uniting the mounting hole 3 and the buffering hole 4, the blade bodies 2 have two counter blade portions 2a and 2b which are disposed at right angles to the width H of the blade bodies. At the center of the blade 1, there is embedded an iron disc (core) 5 having a radius $R_6$ and a thickness t. The core has many perforations 6 by which the upper side and the lower side of the blade body interconnect into one through said perforations so as to prevent undesirable elongation toward the radial direction. The inner walls of the buffering holes 4a are sharpened and two narrow ribs 7 provide concentric relief on the disc 1 and cross along the edges of the buffering holes 4. Typical dimensions of the blade of the present invention are as follows:

$R_1 = 80$ mm, T=3 mm, H=16 mm, L(the length of the blade bodies)=25 mm, $R_2 = 13$ mm, $R_3 = 6$ mm, $R_4 = 10$ mm, $R_5 = 15$ mm, $R_6 = 43$ mm, d(the diameter of the perforation 6)=6 mm, t=1 mm, weight=ca. 0.115 g.

Figure 1:
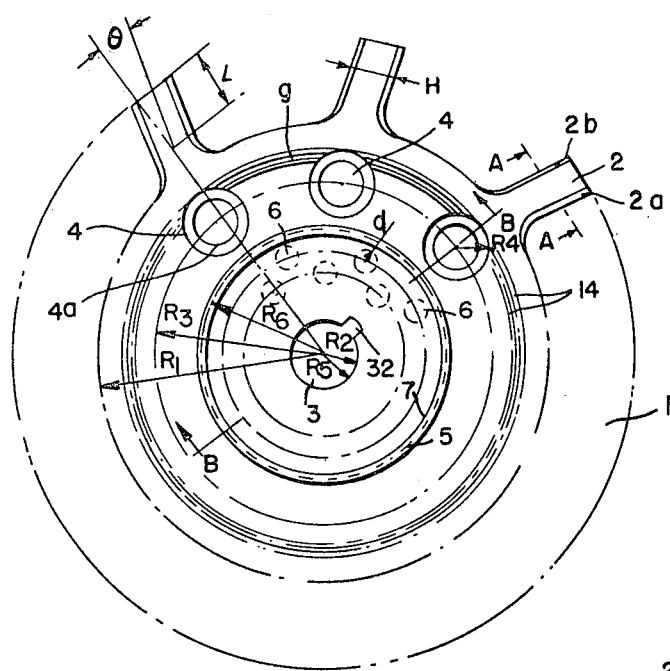
FIG. 1 is a plan view of one embodiment of the disc blade of the present invention.
Figure 1B:
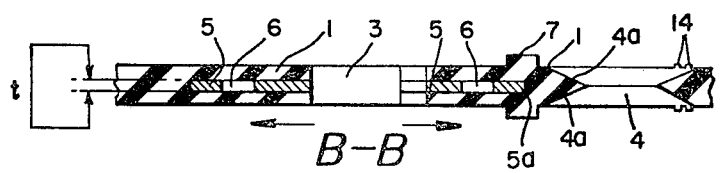
FIG. 1B is a sectional view taken along line B—B of FIG. 1.
Figure 1A:
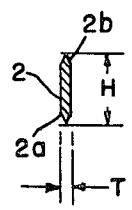
FIG. 1A is a sectional view taken along line A—A of FIG. 1.
Figure 2:
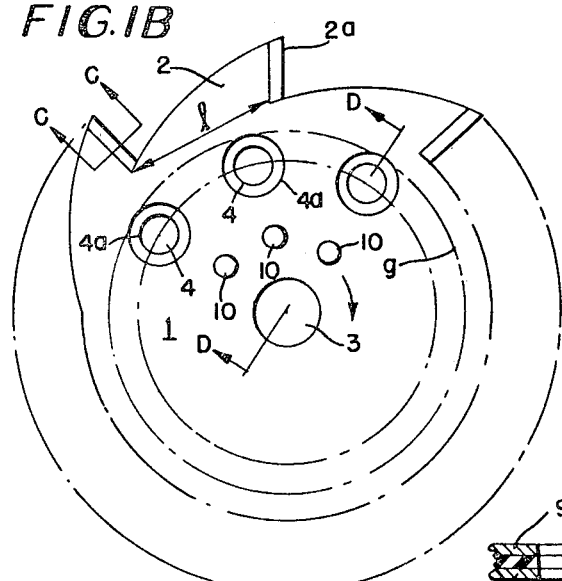
FIG. 2 is a plan view of another embodiment of the disc blade of the present invention.
Figure 2A:
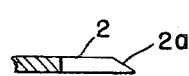
FIG. 2A is a sectional view taken along line C—C of FIG. 2.
Figure 2B:
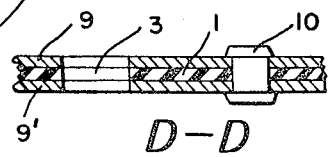
FIG. 2B is a sectional view taken along line D—D of FIG. 2.

In FIG. 2, the blade bodies 2 project like teeth of a rotary saw around the disc 1. Naturally, the use of this blade is limited to one rotating direction as shown by the arrow. The shock resistance of this blade is much stronger than that of FIG. 1 because of its longer diagonal dimension l. In this embodiment, instead of using an embedded core 5 as shown in FIG. 1, there are provided two iron covering plates 9 on the upper and lower surfaces of the disc 1 around its central mounting hole 3. Both of the plates 9 are joined together with rivets 10 which are concentrically disposed.

FIG. 3 shows another embodiment of the present invention wherein the cutting portion of the blade is provided not only at the peripheral portion of the projected blade bodies, as in a sprocket-type, but also at the embayed portions thereof between each projected blade. The blade bodies 2 are disposed equiangularly and radially around the disc 1 and each side edge thereof is inclined at an angle θ relative to the center line. According to this embodiment, the pruning ability will be substantially increased because the entire peripheral portions of the blade are edged and, furthermore, the embayed portions 8 are forced to catch the cutting object. In this embodiment, the buffering holes 4 have an ellipsoidal shape in which its longitudinal axis extends in the radial direction so that the blade can be recovered as a reclaimed blade having long blade bodies. In addition, in this example, the covering plate 9 is provided on only one side surface of the disc 1. The plate is attached to the disc 1 by many pins 11 containing an enlarged head 11a. The pins may be replaced with screws having a countersunk head.

FIG. 4 shows another embodiment of the present invention wherein the blade portions (the cutting edges) 2a are formed around the disc supporting member 1 having an involute shape 2. According to this example, a high speed pruning can be expected since the involute-type cutting edges exert a rectangular force to the object to be cut.

In order to prevent the radial elongation of the disc, in this example, there are provided two covering plates connected together with a bushing construction. Two bushings with flanges 12 and 12' are coupled together through the mounting hole 3. The small projections 13 and 13' are provided at the under surface of the respective flanges and they extend into the disc 1 at the periphery of the mounting hole 3. This construction is very convenient since noninserted, conventional injection molding and the coupling of the bushings are a very simple and inexpensive process which is suitable for mass production.

FIGS. 5 to 7 show other means for reinforcing the disc against elongation. In example 5, the inner portion of the disc 4 is made of a hard elastomer and it is combined with the outer disc portion 15 by the aid of high tensile staples 16 being disposed radially throughout the interface of both portions.

FIG. 6 shows an illustration in which three pieces of canvas 17, 17' and 17", made of polyamide yarns are embedded in the blade in the radial direction. This structure does not restrict the inherent flexibility of the blade material but rather is useful in obtaining a flexible reinforced blade. The canvas may extend through the blade body over the buffering holes.

FIG. 7 is another means for preventing radial elongation in which high tensile yarns 18 made of glass or carbon fibers are embedded in the disc 1. Since the tensile strength of the yarn is so high, this structure is extremely useful for preventing the radial elongation of the disc. To simplify the process the yarn 18 may be preliminarily disposed in the state of a web so as to form a desirable radial arrangement. The yarn material is miscible with the material of the disc or may be meltable under suitable molding temperatures. In the manufacturing process, the web of yarns is inserted into the dies used in the molding process.

FIG. 8 shows a plan view of a reinforcement framework. Two concentrical rings 19 and 19' made of phosphor bronze wire are connected by straight wires 20 extending radially in the outer direction. This framework is placed into the dies during the molding operation and embedded into the disc. The wirs 20 extend to the inside of the blade bodies. Each ring 19 and 19' can selectively be preliminarily treated with a corrugation process in order to obtain good contact with the material of the blade body.

The cutting device using the disc blade as defined by the present invention and shown schematically in FIG. 9 is positioned at the foremost end of a hollow bar 21 and may or may not be provided with a cover. If a cover is utilized, it has a diameter of about one-half the diameter of the blade. An arched grass braker is installed at the front portion of the bar in order to prevent the scattering of weed fragments toward the operator. The engine 22 and the fuel tank 23 is carried on the operator's back utilizing a strap 24 and the device is operated utilizing a swinging or pendulum action pivoted about the body and a handle 25 which can be gripped by the operator. As the operator proceeds forward, repeating the swinging motion, the weeds are pruned down in a broad band.

The bar-type blades of the prior art are far less effective than the disc blade because of (a) a small number of blade bodies, (b) the difference in the rotating speed between the outer portion and the inner portion of the blade body and (c) the comparatively broad breadth of the blade body. Naturally, when the number of blade bodies are two in number, as in the flat bar-type of blade, the opportunity the blade bodies have to contact the weeds is one-fourth that of the disc blade when, for example, eight blade bodies are utilized on the disc blade. Also, in the bar-type blade, at that portion of the blade body disposed one-forth of the distance from the center of the blade, the rotating speed at this innermost portion will be one-half of that at the outermost portion of the blade body. Since the effectiveness of the elastomeric blade is primarily dependent upon the impact speed of the blade body with the weeds, a slow blade speed is decidedly disadvantageous for cutting weeds. In other words, in the prior art devices, the center and adjoining portions of the bar-type blade are not effective for cutting even though the blade is long. In addition, if the blade is broken away as the result of a collision with any rigid obstacles such as a hidden tap, iron post, stone or concrete block, a violent vibration will occur so as to make the device inoperable, or, even though the blade is not broken the shock will cause a dangerous situation since the comparatively broad blade of the bar-type device finds difficulty in adjusting to the collision.

The buffering hole of the blade of the present invention may be filled with a thin membrane 26 made of the same material as the blade but having a thickness of up to about 1 mm. In addition to an inherent buffering effect, this membrane is also effective for preventing scattering of the fragmented grasses and weeds toward the face of the operator. If the buffering hole is not present, the blade bodies are much more easily broken.

Advantageously, the blade of the present invention is provided with a double tapered cutting edge (see FIG. 11) which is far better in sharpness than that of the single tapered edge of the prior art devices (see FIG. 12). The latter's downwardly tapered edge exhibits a more rapid abrasion than the former.

As can be anticipated, sharpness of the blade depends on its hardness when the rotation speed is equal, but fragility to shock and danger by contact will be increased as the hardness increases and vice versa. Advantageously, a Shure Hardness of about 90 is desirable because at about 98 the blade becomes fragile and at about 85 the blade becomes dull.

The shortest distance from the periphery of the buffering hole to the edge of the disc is preferably within the range of about 3 to 10 mm. If this distance is too short, the sharp cutting effect is adversely affected and, if the distance is too long, the hole loses its inherent buffering effect to shock.

In the bar-type blade as prepared according to U.S. Pat. No. 3,343,350, it has been frequently observed that the cut stalks of weeds tended to coil around the shaft of the machine, thereby stopping the operation until the coiled stalks could be removed, irrespective of whether the cover was present or not. The disc blade of the present invention substantially illuminates this problem.

Finally, in manufacturing the disc blade of the present invention and to limit the random arrangement of the weld lines, it is most preferable to inject the fused resin into the center of the dies through, preferably, a fan gate. By this means, the weld lines are almost arranged along the radii from the center of the disc to the centers of the blade bodies. The center portion of the blade thus molded is then trimmed by a pressing or shearing process. If manufactured otherwise, the weld lines will be arranged randomly, often to the base of the blade bodies so as to weaken the strength of the blade bodies.

As explained hereinabove, the present invention has entirely solved the suspending problems of known elastomeric blades and also achieves safety in the smooth cutting of tough weeds. Furthermore, the blade can easily be reclaimed with a simple procedure and, thus, may be used for a long time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotary blade for a pruning machine possessing good tensile strength, good tear resistance, good abrasion resistance, good light stability, and good flexibility which comprises
   a disc portion and cutting blade portion, said cutting blade portion including a plurality of cutting blades projecting radially from the periphery of said disc portion, said disc portion and cutting blade portion being made of a flexible, high molecular weight, elastomeric material selected from the group consisting of natural rubber, styrene-butadiene rubber, polychloroprene, cis-1,4-polyisoprene, cis-1, 4-polybutadiene, syndiotactic 1,2-polybutadiene, ethylene-propylene copolymer, ethylene-propylene rubber, butyl rubber, polurethanes, polyester elastomers, Hypalon$^R$ (CSM), polyvinyl ethers, polypropylene oxide, epoxy resins, polystyrene, polybutadiene block copolymers, butadiene-ethylene copolymer, isobutyleneisoprene copolymer, chlorosulfonated polyethylene, organic polysulfides, acrylic rubbers, and ethylene-vinyl acetate copolymer,
   a mounting hole disposed in the center of the disc portion,
   a rigid core member embedded in the elastomere surrounding the mounting hole wherein the diameter of said core member is from about one-third to about one-half that of the diameter of the rotary blade, and
   a plurality of buffering holes disposed along the periphery of the disc portion along the radii connecting the center of the disc portion with the body of each cutting blade portion.

2. The rotary blade of claim 1 wherein a reinforcing agent is added to the elastomeric material.

3. The rotary blade of claim 2 wherein the reinforcing agent is a material selected from the group consisting of silica, carbon black, staples of synthetic carbon or glass fibers, and cat whiskers.

4. The rotary blade of claim 1 wherein to improve the heat durability and abrasion resistance or creep resistance, the elastomeric material is further blended with a synthetic resin selected from the group consisting of polyvinyl chloride, acrylonitrile-butadiene-styrene polymer, polyolefins, ethylene-vinyl acetate copolymer, acrylonitrile-styrene copolymers, acetal resins, silicone resins and fluorine containing resins including polytetrafluoroethylene.

5. The rotary blade of claim 2 wherein when the elastomer as a thermaplastic type polyurethane, and the reinforcing agent is present in an amount of about 15 to 30% by weight.

6. The rotary blade of claim 1 wherein the core member has at least one rigid plate disposed in the surface of the disc portion around the mounting hole.

7. The rotary blade of claim 1 wherein the core member comprises an inwardly disposed hard elastomer and an outwardly disposed soft elastomer, both of said elastomers being combined into one element.

8. The rotary blade of claim 7 wherein the interface between the inward hard elastomer and the outward soft elastomer is connected with a plurality of high tensile staples.

9. The rotary blade of claim 1 wherein the inner walls of the buffering holes are provided with a sharpened edge.

10. The rotary blade of claim 1 wherein a guideline for cutting the blade off when the cutting blade portion is worn off, is provided along the circle crossing with the periphery of the buffering holes.

11. The rotary blade of claim 10 wherein the guideline is composed of double circles relieved from the surfaces of the disc portion.

12. The rotary blade of claim 1 wherein the cutting blade portion has a generally retangular shape with its blade being canted at a slight angle from a radial line extending from the center of the rotary blade to the cutting portion of the blade.

13. The rotary blade of claim 1 wherein the cutting blade portion extends from the disc portion with involuted cutting surfaces on opposing sides thereof.

14. The rotary blade of claim 1 wherein circular holes are provided in the elastomer of the disc portion of the rotary blade in the vicinity of the core so as to expose the upper and lower surfaces of the core to the environment.

15. The rotary blade of claim 1 wherein the buffering holes are filled with a thin membrane made of the same material as the rotary blade.

16. The rotary blade of claim 15 wherein the membrane has a thickness up to about 1 mm.

17. The rotary blade of claim 1 wherein the core member comprises fibers having a high Young's modulus.

18. A cutting device comprising a bar member, a motor means disposed at one end portion of the bar member, a rotary blade disposed at the other end portion of the bar member and operatively connected to said motor means and handle means attached to said bar member for causing said rotary blade to be traversed through any desired cutting plane, said rotary blade comprising a disc portion and a cutting blade portion, said cutting blade portion including a plurality of cutting blades projecting radially from the periphery of said disc portion, said disc portion and cutting blade portion being made of a flexible, high molecular weight, elastomeric material selected from the group consisting of natural rubber, styrene-butadiene rubber, polychloroprene, cis-1, 4-polyisoprene, cis-1, 4-polybutadiene, syndiotactic 1,2-polybutadiene, ethylene-propylene copolymer, ethylene-propylene rubber, buty rubber, polyurethanes, polyester elastomers, Hypalon$^R$ (CSM), polyvinyl ethers, polypropylene oxide, epoxy resins, polystyrene, polybutadiene block copolymers, butadiene-ethylene copolymer, isobutylene-isoprene copolymer, chlorosulfonated polyethylene, organic polysulfides, acrylic rubbers, and ethylene-vinyl acetate copolymer, a mounting hole disposed in the center of the disc portion, a rigid core member embedded in the elastomere surrounding the mounting hole wherein the diameter of said core member is from about one-third to about one-half that of the diameter of the rotary blade, and a plurality of buffering holes disposed along the periphery of the disc portion along the radii connecting the center of the disc portion with the body of each cutting blade portion.

* * * * *